US012763915B2

(12) United States Patent
Pedersen et al.

(10) Patent No.: US 12,763,915 B2
(45) Date of Patent: Oct. 13, 2026

(54) OPTIMIZED CQI FEEDBACK FOR CODE BLOCK GROUP BASED TRANSMISSIONS FOR EXTENDED REALITY USE CASES

(71) Applicant: Nokia Technologies Oy, Espoo (FI)

(72) Inventors: Klaus Ingemann Pedersen, Aalborg (DK); Troels Emil Kolding, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 266 days.

(21) Appl. No.: 18/724,347

(22) PCT Filed: Mar. 10, 2023

(86) PCT No.: PCT/EP2023/056116

§ 371 (c)(1),
(2) Date: Jun. 26, 2024

(87) PCT Pub. No.: WO2023/186489

PCT Pub. Date: Oct. 5, 2023

(65) Prior Publication Data

US 2025/0070949 A1 Feb. 27, 2025

Related U.S. Application Data

(60) Provisional application No. 63/324,186, filed on Mar. 28, 2022.

(51) Int. Cl.
*H04L 5/00* (2006.01)
*H04L 1/00* (2006.01)

(52) U.S. Cl.
CPC .......... *H04L 5/0057* (2013.01); *H04L 1/0003* (2013.01); *H04L 1/0009* (2013.01); *H04L 1/0026* (2013.01); *H04L 5/0048* (2013.01)

(58) Field of Classification Search
None
See application file for complete search history.

(56) References Cited

U.S. PATENT DOCUMENTS

2020/0053742 A1* 2/2020 Li .......................... H04B 17/24
2021/0050879 A1 2/2021 Pezeshki et al.
(Continued)

FOREIGN PATENT DOCUMENTS

WO 2021/163162 A1 8/2021

OTHER PUBLICATIONS

"New SID "Study on XR Enhancements for NR"", 3GPP TSG RAN Meeting #94e, RP-213587, Agenda: 8A.2, Nokia, Dec. 6-17, 2021, 5 pages.
(Continued)

*Primary Examiner* — Angela Nguyen
(74) *Attorney, Agent, or Firm* — Barta Jones, PLLC

(57) ABSTRACT

Disclosed in a mechanism for optimizing channel quality indicator feedback for code block group based transmissions, wherein a user equipment of a communication network receives an enhanced channel quality indicator configuration. Based on the enhanced channel quality indicator configuration, the user equipment performs measurements of channel state information reference resources with a plurality of code block groups comprising determining a highest data rate modulation and coding scheme index supported by the user equipment with an error probability that will not exceed a predetermined threshold for reception of at least one transport block from the communication network, and based on the performing, the user equipment sends, towards the communication network, information expressed with a channel quality index comprising an indication of the determined highest data rate modulation and coding scheme index for use with link adaption for improv-
(Continued)

ing spectral efficiency of radio resource allocations of at least one transport block with more than one code block group for at least one physical downlink shared channel transmission from the communication network, wherein the information expressed with the channel quality index comprises an enhanced channel quality indicator report that identifies a new enhanced channel quality indicator report table enumerating the highest data rate modulation and coding scheme index supported by the user equipment and an effective code rate that the communication network is directed to use for the at least one physical downlink shared channel transmission.

20 Claims, 5 Drawing Sheets

(56) References Cited

U.S. PATENT DOCUMENTS

| | | | | |
|---|---|---|---|---|
| 2021/0112434 | A1 | 4/2021 | Josan et al. | |
| 2021/0144715 | A1 | 5/2021 | Gotoh et al. | |
| 2021/0160023 | A1 | 5/2021 | Liu et al. | |
| 2021/0242985 | A1 | 8/2021 | Nam et al. | |
| 2021/0329614 | A1 | 10/2021 | Park et al. | |
| 2023/0361910 | A1* | 11/2023 | Wu | H04W 4/70 |
| 2023/0421227 | A1* | 12/2023 | Lee | H04B 7/0632 |

OTHER PUBLICATIONS

Pocovi et al., "Channel Quality Feedback Enhancements for Accurate URLLC Link Adaptation in 5G Systems",IEEE 91st Vehicular Technology Conference (VTC-Spring), May 25-28, 2020, 6 pages.

Saija et al., "A Machine Learning Approach for SNR Prediction in 5G Systems", IEEE International Conference on Advanced Networks and Telecommunications Systems (ANTS), Dec. 16-19, 2019, pp. 1-6.

S et al., "Reinforcement Learning Based Link Adaptation in 5G URLLC", 8th International Conference on Smart Computing and Communications (ICSCC), Jul. 1-3, 2021, pp. 159-163.

"3rd Generation Partnership Project; Technical Specification Group Radio Access Network; NR; Physical layer procedures for data (Release 17)", 3GPP TS 38.214, V17.0.0, Dec. 2021, pp. 1-217.

"3rd Generation Partnership Project; Technical Specification Group Radio Access Network; NR; Physical layer measurements (Release 17)", 3GPP TS 38.215, V17.0.0, Dec. 2021, pp. 1-26.

"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.

"3rd Generation Partnership Project; Technical Specification Group Radio Access Network; NR; Physical layer procedures for control (Release 17)", 3GPP TS 38.213, V17.0.0, Dec. 2021, pp. 1-225.

"3rd Generation Partnership Project; Technical Specification Group Radio Access Network; NR; Medium Access Control (MAC) protocol specification (Release 16)", 3GPP TS 38.321, V16.7.0, Dec. 2021, pp. 1-158.

"3rd Generation Partnership Project; Technical Specification Group Radio Access Network; Study on XR (Extended Reality) Evaluations for NR (Release 17)", 3GPP TR 38.838, V17.0.0, Dec. 2021, pp. 1-272.

Khosravirad et al., "Flexible Multi-Bit Feedback Design for HARQ Operation of Large-Size Data Packets in 5G", IEEE 85th Vehicular Technology Conference (VTC Spring), Jun. 4-7, 2017, 5 pages.

Goktepe et al., "Reduced CBG HARQ Feedback for Efficient Multimedia Transmissions in 5G for Coexistence with URLLC Traffic", IEEE International Symposium on Broadband Multimedia Systems and Broadcasting (BMSB), Jun. 6-8, 2018, 5 pages.

Wu, "Multilevel Code-block Group based HARQ-ACK Control Channel Design", International Conference on Computing, Networking and Communications (ICNC), Mar. 5-8, 2018, pp. 264-268.

Yeo et al., "Partial Retransmission Scheme for HARQ Enhancement in 5G Wireless Communications", IEEE Globecom Workshops (GC Wkshps), Dec. 4-8, 2017, 5 pages.

Han et al., "System-level Performance Evaluation with 5G K-SimSys for 5G URLLC System", 16th IEEE Annual Consumer Communications & Networking Conference (CCNC), Jan. 11-14, 2019, 5 pages.

Pedersen et al., "Rethink Hybrid Automatic Repeat reQuest Design for 5G: Five Configurable Enhancements", IEEE Wireless Communications, vol. 24, No. 06, Dec. 2017, pp. 154-160.

"Discussion on enhancements for XR", 3GPP TSG-RAN WG1 Meeting #106e, Tdoc R1-2107631, Agenda: 8.14.4, Ericsson, Aug. 16-27, 2021, pp. 1-5.

"3rd Generation Partnership Project; Technical Specification Group Radio Access Network; NR; User Equipment (UE) feature list (Release 15)", 3GPP TS 38.822, V15.0.0, Jun. 2019, pp. 1-64.

Jiang et al., "Latency Performance of 5G New Radio for Critical Industrial Control Systems", 24th IEEE International Conference on Emerging Technologies and Factory Automation (ETFA), Sep. 10-13, 2019, pp. 1135-1142.

Pocovi et al., "Joint Link Adaptation and Scheduling for 5G Ultra-Reliable Low-Latency Communications", IEEE Access, vol. 06, May 21, 2018, pp. 28912-28922.

"SOD on Use Cases for SI on Data Collection", 3GPP TSG-RAN WG3 #110-e, R3-206874, Agenda: 18.3, Huawei, Nov. 2-12, 2020, 18 pages.

"Discussion on CSI feedback enhancements for URLLC", 3GPP TSG RAN WG1 #106-e, R1-2107444, Agenda: 8.3.1.2, LG Electronics, Aug. 16-27, 2021, 5 pages.

"New SID on XR Enhancements for NR", 3GPP TSG RAN Meeting #94e, RP-213558, Agenda: 8A.2, Nokia, Dec. 6-17, 2021, 5 pages.

International Search Report and Written Opinion received for corresponding Patent Cooperation Treaty Application No. PCT/EP2023/056116, dated May 15, 2023, 15 pages.

"Discussion on XR-specific capacity enhancements", 3GPP TSG RAN WG1 #109-e, R1-2204675, Agenda: 9.11.2, Nokia, May 9-20, 2022, 15 pages.

Paymard et al., "Extended Reality over 3GPP 5G-Advanced New Radio: Link Adaptation Enhancements", arXiv, Oct. 26, 2022, pp. 1-27.

"Discussion on CBG-based feedback and retransmission", 3GPP TSG RAN WG1 Meeting #88bis, R1-1705066, Agenda: 8.1.3.3.2, Huawei, Apr. 3-7, 2017, 4 pages.

* cited by examiner

The UE shall derive for each CQI value reported in uplink slot *n* the highest CQI index which satisfies the following condition:

- A single PDSCH transport block with a combination of modulation scheme, target code rate and transport block size corresponding to the CQI index and occupying a group of downlink physical resource blocks termed the CSI reference resource, could be received with a transport block error probability not exceeding:
- 0.1, if the higher layer parameter *cqi-Table* in *CSI-ReportConfig* configures 'table 1' (corresponding to Table 5.2.2.1-2), or 'table2' (corresponding to Table 5.2.2.1-3), or if the higher layer parameter *cqi-Table* in *CSI-ReportConfig* configures 'table4-r17' (corresponding to Table 5.2.2.1-5), or
- 0.00001, if the higher layer parameter *cqi-Table* in *CSI-ReportConfig* configures 'table3' (corresponding to Table 5.2.2.1-4).

FIG. 1

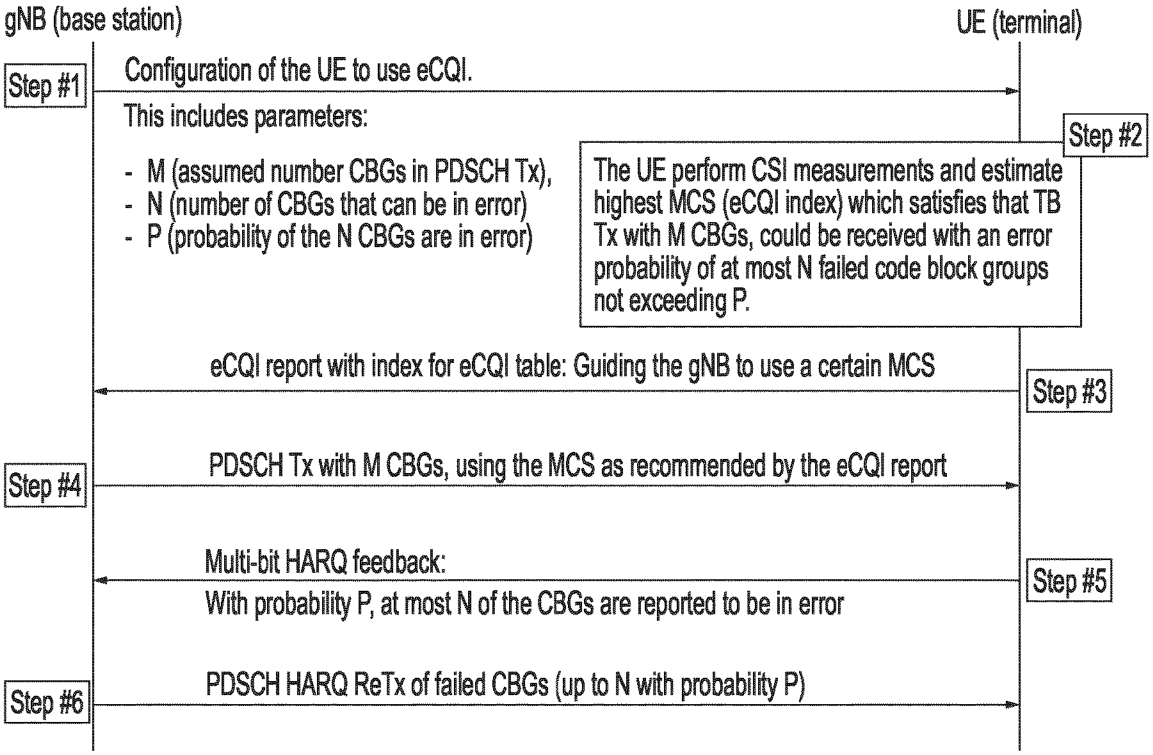

FIG. 2

The UE shall derive for each CQI value reported in uplink slot *n* the highest CQI index which satisfies the following condition:

- A single PDSCH transport block with a combination of modulation scheme, target code rate and transport block size corresponding to the CQI index, and occupying a group of downlink physical resource blocks termed the CSI reference with M code block groups, could be received with an error probability of a most N failed code block groups not exceeding.
  - 0.1, if the higher layer parameter *cqi-Table* in *CSI-ReportConfig* configures this, or
  - 0.3, if the higher layer parameter *cqi-Table* in *CSI-ReportConfig* configures this Parameters M and N are configured in *CSI-ReportConfig*

FIG. 3

OPTIMIZED CQI FEEDBACK FOR CODE BLOCK GROUP BASED TRANSMISSIONS FOR EXTENDED REALITY USE CASES

RELATED APPLICATION

This application was originally filed as PCT Application No. PCT/EP2023/056116 on Mar. 10, 2023, which claims priority from U.S. Provisional Application No. 63/324,186 filed on Mar. 28, 2022, both of which are incorporated herein by reference in their entirety.

TECHNICAL FIELD

The teachings in accordance with the exemplary embodiments of this invention relate generally to optimizing channel quality indicator feedback for code block group based transmissions and, more specifically, relate to optimizing channel quality indicator feedback for code block group based transmissions in order to perform link adaptation for spectral efficiency.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

ACK acknowledgement
ARQ automatic repeat request
BLER block error rate
CB code block
CBG code block group
CQI channel quality indicator
CSI channel state information
DL downlink
HARQ hybrid automatic repeat request
IE information element
IoT internet of things
LA link adaptation
MAC medium access control
MCS modulation and coding scheme
ML machine learning
NACK negative acknowledgement
OFDM orthogonal frequency domain multiplexing
OLLA outer loop link adaptation
PDSCH physical downlink shared channel
RE resource element
RRC radio resource control
RS reference signal
SINR signal to interference noise ratio
TB transport block
TBS transport block size
TSC time sensitive communication
UE user equipment
UL uplink
URLLC ultra reliable low latency communication
QoS quality of service
XR extended reality Example embodiments in this invention is related to at least improved link adaptation (LA) such as for XR use cases, where code block group (CBG) based Hybrid Automatic Repeat request (HARQ) is applied.

It is noted that an approved Rel-18 Item on XR over NR that is captured in the 3GPP document RP-213558 marks the start of the 5G-Advanced era of 5G enhancements. Notice that also based on XR over NR, some companies proposed to have improved CQI feedback schemes to better serve XR traffic. However, at the time of this application, no specific solutions were proposed.

Example embodiments of the invention work to provide such solutions for improved CQI feedback schemes.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 1 shows a Table 1 with an extract of CQI specification text from standards;

FIG. 2 shows a simple illustration of signaling flow between the serving cell gNB and the UE in accordance with example embodiments of the invention;

FIG. 3 shows a Table 2 with a eCQI reporting scheme with changes in accordance with example embodiments of the invention underlined;

DETAILED DESCRIPTION

Figure 4:
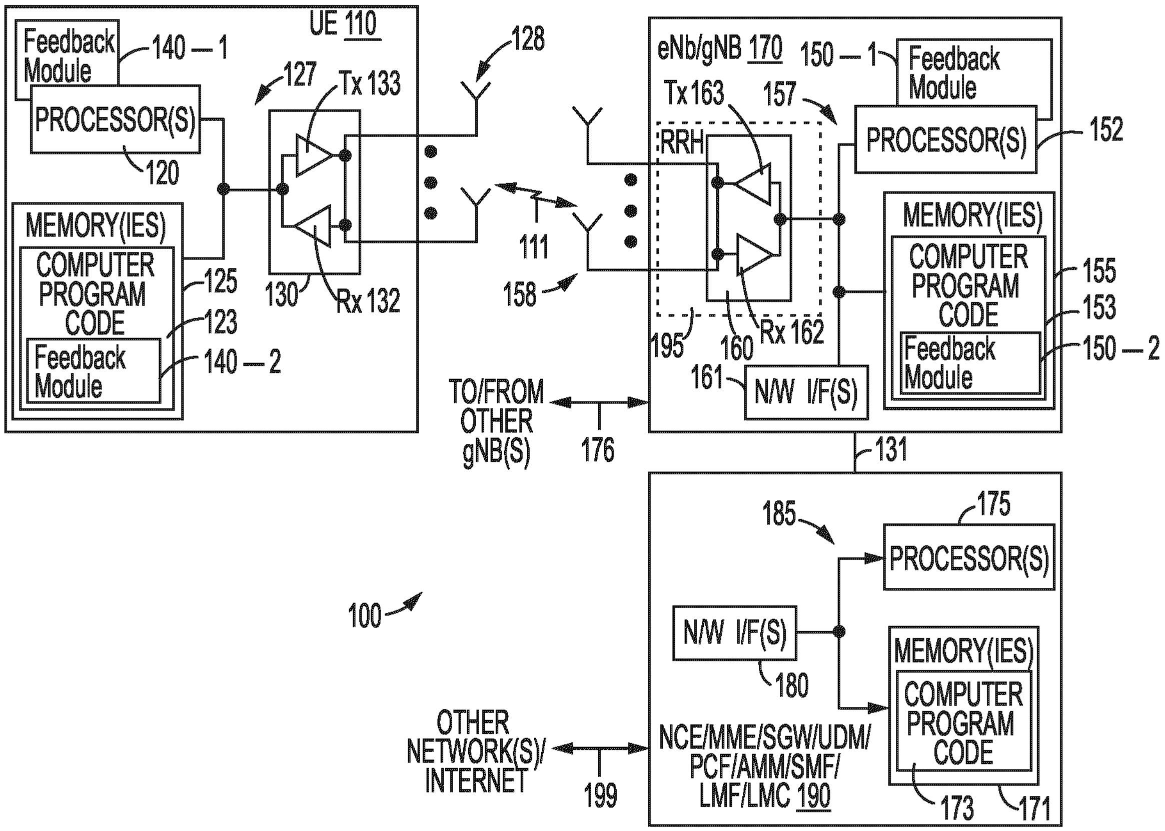
FIG. 4 shows a high level block diagram of various devices used in carrying out various aspects in accordance with example embodiments of the invention.

Example embodiments of this invention relate to optimizing channel quality indicator feedback for code block group based transmissions in order to perform link adaptation for spectral efficiency for the transmissions.

This invention is related to improved link adaptation (LA) for XR use cases, where code block group (CBG) based Hybrid Automatic Repeat request (HARQ) is applied. More specifically, we propose a new enhanced CQI feedback scheme from the UE that is advantageous for XR use cases where the gNB transmits large payloads to the UE using CBG-based transmissions. We call this eCQI—enhanced CQI—in relation that the CQI format is enhanced to fit with use-cases where CBG transmissions are applied (ex. XR use-cases). As stated above, the example embodiments of the invention are relevant for 5G-Advanced Enhancements Release 18 item on Enhancements for XR.

The currently defined CQI feedback schemes for NR all rely on providing information to guide the gNB on the maximum modulation and coding scheme (MCS) that it can use without exceeding a certain first transmission BLER target. Such CQI solutions are attractive for the legacy HARQ transmission modes, where the full transport block (TB) is retransmitted in case of errors, and hence it makes sense to have CQI feedback that expresses the recommended MCS for a certain BLER of the first transmission of the TB. However, for CBG-based HARQ operation, the full TB is seldom retransmitted as only the potentially erroneously received CBGs are subject to retransmission. If we e.g.

consider a TB that consists of 8 CBGs (as supported by the NR specs), one can easily calculate that for a 10% first transmission BLER, only one or two CBGs will be retransmitted. For a 50% first transmission BLER, there is 99.9% probability of retransmitting 1-3 CBGs. These simple numerical examples are under simplified assumptions of identical independent error probabilities for the CBGs.

Nevertheless, it shows that even with high initial BLER values for first transmissions, only a modest fraction of CBGs in the TB require retransmission. For XR cases with large incoming frames, we typically schedule the user over the full bandwidth with really large TB's that consists of 8 CBGs (maximum number of CBGs in a TB as per current NR specs). The packet delay budget (PDB) for XR transmissions is typically on orders of 5-15 ms for the RAN part, which means that it allows for at least one HARQ transmissions, and in many cases even two retransmissions can be afforded without jeopardizing the PDB. However, due to the large TB's for XR, it becomes costly from a memory point of view if we start to have too much retransmissions.

One objective of example embodiments of the invention is therefore to develop a new CQI scheme that guides the gNB on the maximum MCS scheme it can use while ensuring that only a certain maximum subset of CBGs will need retransmission with a controllable probability. E.g. have a CQI scheme that guides the gNB to use a MCS index such that at most 4 CBGs (out of 8 CBGs) will require retransmission with P=0.1 probability (10%). While some estimations can be achieved on the gNB side, more accurate assessment is available on the UE side where the channel quality and correlations among CBGs and CBG errors can be monitored in detail. So how to design such CQI solution is the problem addressed in this application.

The 5G NR include various options for CQI feedbacks. Basic LTE-alike CQI schemes were standardized corresponding to a BLER target of 0.1 (10%), including options for wideband and frequency selective CQI. Also cases with the so-called Best-M frequency selective CQI scheme were standardized, where the indicated MCS index corresponds to the channel quality of the best M sub bands. For NR, the UE is typically configured to measure its channel quality on the CSI-RS resources to determine which MCS index it can support, subject to its first transmission BLER constraint (which by default is 10%). Standards also support research conducted on multiple CQI enhancements for URLLC/TSC use cases, where small payloads of e.g., 20-50 bytes only needs to be sent with very high reliabilities with PDBs of only ~0.5 ms which leaves no room for HARQ retransmissions. In standards additional CQI Tables for other BLER targets such as 10-5 as required for some IoT use cases were standardized. In 3GPP TS 38.214 Rel-17 further CQI enhancements to enable 4-bit sub-band, CQI feedbacks were introduced. In addition to what have been standardized, research on many other CQI schemes for URLLC/TSC cases with the target of optimizing link adaptation performance for small payloads under URLLC/TSC constrains has been published—including cases also with use of ML-based techniques.

The standardized NR physical layer UE procedures for reporting CQI and more details on PHY layer measurements (incl. CSI-RS) are captured in standards. The higher layer configuration which CQI format to use happens via RRC signaling as specified in standards.

FIG. 1 shows a Table 1 with an extract of CQI specification text from 3GPP TS 38.214.

In addition to the text in Table 1 of FIG. 1, the specifications also include mechanisms to control time-domain measurement restrictions for the UE for the purpose of CQI estimation via parameters timeRestrictionForChannelMeasurements and timeRestrictionForInterferenceMeasurements for measuring the experienced interference, while higher layer parameters cqi-BitsPerSubband in CSI-Report-Config controls the CQI resolution (number of bits) per sub band for cases with frequency selective CQI.

In the context of this application, it is important to notice that 3GPP (and academia) have so far not had focus on developing improved CQI schemes for high data rate cases (such as XR) where CBG-based transmissions are used. This is an overlooked topic, which will be addressed in this application with respect to example embodiments of this invention.

The basic principle is that the TB is organized as into multiple Code Blocks (CBs). The maximum size of a CB is 8448 bits. The CBs are grouped into CBGs. For each received TB, the receiver provides feedback to indicate which CBGs are in error, and only the erroneously received CBGs are thereafter retransmitted by the transmitter. For transmission of large TB for XR use cases as defined in standards, cases with 8 CBGs per TB are supported by current NR specs. More generally, the maximum number of CBGs per TB is configurable as $N \in \{2, 4, 6, 8\}$ for the PDSCH.

Example embodiments of the invention relate to at least New Radio (NR) and 5G technologies and looks at improving/enhancing link adaptation (LA) for extended reality (XR) use cases, when code block group (CBG) based Hybrid Automatic Repeat request (HARQ) is applied. The example embodiments of the invention are applicable not only to XR cases, but also to similar setups having a high data rate plus delay-stringent transmission, i.e., for IIoT or similar cases.

At the time of the application and in the situation of CBG-based HARQ schemes, the full TB is seldom retransmitted, due to the fact that only potentially erroneously received CBGs are subject to retransmission. Rather, when this is applied to XR scenarios, (with large receive frames), a user is scheduled over the full bandwidth, having 8 CBGs (which is the maximum number of CBGs in a TB defined in the NR/5G specifications). However, in XR scenarios, the packet delay budget (PDB) for the transmissions will be typically of the order of 5-15 ms for the RAN part, which means that at least one HARQ transmission and possibly two retransmissions can be done without violating or jeopardizing the PDB. However, due to the large TB's for XR, in the event of having too many retransmissions, the cost on the amount of memory required will increase and thus reduce the efficiency of the system.

Certain example embodiments of the invention therefore propose a CQI mechanism that will allow the gNB to determine the maximum MCS scheme it can use while ensuring that only a certain maximum subset of CBGs will need retransmission with a controllable probability. The main point of the proposal is that a UE will perform measurements on the CSI reference resources to determine the received post detection SINR. Based on these measurements, the UE will then estimate the effective SINR for the M-different CBGs. The UE thereafter determines the highest MCS that it can support, while at most N of the M CBGs are in error with probability P. The M, N and P values such as based on integers are provided by the network via the gNB. The UE then will report them to the gNB in the form of an enhanced CQI index that points to a new enhanced CQI table that enumerates the supported modulation scheme, effective code rate, and overall efficiency that it recommends the gNB to use for its next PDSCH transmissions. The gNB in turn will adapt its transmissions to the enhanced CQI index when scheduling future PDSCH transmissions.

One idea behind these improvements is that, as on the UE side, a more accurate estimation on the channel quality and correlations among CBGs and CBG errors can be performed, the UE can dynamically measure and provide feedback to the gNB, so that gNB can then adjust its future DL transmissions according to the received feedback).

Some example embodiments of the invention for eCQI can summarized as follows:

1) The gNB configures the UE to use eCQI (CBG optimized) reporting where the UE shall estimate highest supported MCS (expressed via a CQI index), assuming that downlink transmissions occupy a group of downlink physical resource blocks termed the CSI reference resource with M code block groups, while the error probability of at most N failed code block groups does not exceed P. Parameters M, N, and P are configured by the network;
2) The UE performs measurements on the CSI reference resources to determine the received post detection SINR. Based on these measurements, the UE estimates the effective SINR for the M-different CBGs. The UE thereafter determine the highest MCS that it can support, while at most N of the M CBGs are in error with probability P. To conduct its estimation, it may include observations on previous CBG transmissions (ex. burst error probabilities, correlations, etc.) to improve its estimate of the effective SINR. This may be implemented in the UE may having a table with CBG error rate vs effective SINR for the different MCS's;
3) The reporting of the eCQI may be in the form of an eCQI index that points to a new eCQI table that enumerates the supported modulation scheme, effective code rate, and overall efficiency that it recommends the gNB to use for its PDSCH transmissions;
4) The gNB conducts link adaptation according to the eCQI index when scheduling PDSCH transmissions, say sending a large TB that consistent of M CBGs that may contain a full or partial XR information frame;
5) The UE decodes the PDSCH transmission, where at most of N of the M CBGs are detected to be in error with probability P; and
6) Above loop is adopted as a UE capability test requirement in 3GPP, ex. using a known channel environment and letting the gNB transmit according to the eCQI reports of the end-user and then monitoring the individual CBG ACK/NACKs for compliance.

Before describing the example embodiments of the invention in further detail reference is made to FIG. 4. FIG. 4 shows a block diagram of one possible and non-limiting exemplary system in which the exemplary embodiments may be practiced.

As shown in FIG. 4, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include an Feedback Module 140 which is configured to perform the example embodiments of the invention as described herein. The Feedback Module 140 may be implemented in hardware by itself of as part of the processors and/or the computer program code of the UE 110. The Feedback Module 140 comprising one of or both parts 140-1 and/or 140-2, which may be implemented in a number of ways. The Feedback Module 140 may be implemented in hardware as Feedback Module 140-1, such as being implemented as part of the one or more processors 120. The Feedback Module 140-1 may be implemented also as an integrated circuit or through other hardware such as a programmable gate array. In another example, the Feedback Module 140 may be implemented as Feedback Module 140-2, which is implemented as computer program code 123 and is executed by the one or more processors 120. Further, it is noted that the Feedback Modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes an Feedback Module 150 which is configured to perform example embodiments of the invention as described herein. The Feedback Module 150 may comprise one of or both parts 150-1 and/or 150-2, which may be implemented in a number of ways. The Feedback Module 150 may be implemented in hardware by itself or as part of the processors and/or the computer program code of the gNB 170. Feedback Module 150-1, such as being implemented as part of the one or more processors 152. The Feedback Module 150-1 may be implemented also as an integrated circuit or through other hardware such as a programmable gate array. In another example, the Feedback Module 150 may be implemented as Feedback Module 150-2, which is implemented as computer program code 153 and is executed by the one or more processors 152. Further, it is noted that the Feedback Modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via links 176 and/or 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations. The NCE/MME/SGW/UDM/PCF/AMM/SMF/LMF/LMC 190 is configurable to perform operations in accordance with example embodiments of the invention in any of an LTE, NR, 5G and/or any standards based communication technologies being performed or discussed.

The gNB 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the UE 110 and/or gNB 170 for 5G and/or NR operations in addition to any other standards operations implemented or discussed.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, gNB 170, and/or NCE/MME/SGW/UDM/PCF/AMM/SMF/LMF/LMC 190 as in FIG. 4.

It is noted that functionality(ies), in accordance with example embodiments of the invention, of any devices as shown in FIG. 4 e.g., the UE 110 and/or gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 4 at least via the wireless link 111 and/or via the NCE/MME/SGW/UDM/PCF/AMM/SMF/LMF/LMC 190 using link 199 to Other Network(s)/Internet as in FIG. 4.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions, in addition for vehicles such as autos and/or truck and arial vehicles such as manned or unmanned arial vehicle and as well as portable units or terminals that incorporate combinations of such functions.

As similarly stated above, example embodiments of the invention for eCQI can summarized as follows:

1) The gNB configures the UE to use eCQI (CBG optimized) reporting where the UE shall estimate highest supported MCS (expressed via a CQI index), assuming that downlink transmissions occupy a group of downlink physical resource blocks termed the CSI reference resource with M code block groups, while the error probability of at most N failed code block groups does not exceed P. Parameters M, N, and P are configured by the network;
2) The UE performs measurements on the CSI reference resources to determine the received post detection SINR. Based on these measurements, the UE estimates the effective SINR for the M-different CBGs. The UE thereafter determine the highest MCS that it can support, while at most N of the M CBGs are in error with probability P. To conduct its estimation, it may include observations on previous CBG transmissions (ex. burst error probabilities, correlations, etc.) to improve its estimate of the effective SINR. This may be implemented in the UE may having a table with CBG error rate vs effective SINR for the different MCS's;
3) The reporting of the eCQI may be in the form of an eCQI index that points to a new eCQI table that enumerates the supported modulation scheme, effective code rate, and overall efficiency that it recommends the gNB to use for its PDSCH transmissions;

4) The gNB conducts link adaptation according to the eCQI index when scheduling PDSCH transmissions, say sending a large TB that consistent of M CBGs that may contain a full or partial XR information frame;
5) The UE decodes the PDSCH transmission, where at most of N of the M CBGs are detected to be in error with probability P; and
6) Above loop is adopted as a UE capability test requirement in 3GPP, ex. using a known channel environment and letting the gNB transmit according to the eCQI reports of the end-user and then monitoring the individual CBG ACK/NACKs for compliance.

The eCQI is assumed to be used in particular and M is known to the network (ex. the actual transmissions towards a UE corresponds to how CBG transmissions are configured over RRC). For cases where UE has other more dynamic traffic in parallel, the eCQI can be combined (or operating in parallel) with a more traditional CQI.

In accordance with example embodiments of the invention there is a new method to conduct efficient link adaptation for transmission of large TB's that consists of multiple CBGs, where it is desirable to transmit with as high as possible MCS while ensuring that only a subset of the CBGs is in error with a predetermined error probability. This is realized with introduction of a new eCQI reporting mechanism as summarized above. Note that this is very different from current legacy CQI schemes that aim at controlling only the first transmission BLER of the full TB.

One advantage of the proposed eCQI in accordance with example embodiments of the invention is that it offers a more spectral efficient PDSCH link adaptation solution for large TB transmissions while the radio resources for the HARQ retransmissions are efficiently controlled to only account for N out of M CBGs with probability P. The improved spectral efficiency of using the new PDSCH link adaption method based on the proposed eCQI scheme maps to higher system capacity. This is in line with one of the objectives for the standards at the time of this application on Enhancements for XR that reads " . . . capacity improvements . . . by means of more efficient radio resource allocations . . . ".

FIG. 2 shows a simple illustration of signaling flow between the serving cell gNB and the UE in accordance with example embodiments of the invention.

A basic signaling flow between the serving cells gNB and the UE in accordance with example embodiments of the invention is illustrated in FIG. 2. First Step #1 of FIG. 2, the gNB configures the UE to use the eCQI scheme (CBG aware). That is, the gNB configures the UE to use eCQI reporting where the UE shall estimate highest supported MCS (expressed via a CQI index), assuming that downlink transmissions occupy a group of downlink physical resource blocks termed the CSI reference resource with M code block groups, while the error probability of at most N failed code block groups does not exceed P. Parameters M, N, and P are configured by the network. The configuration of the UE to use eCQI also include corresponding physical layer resources to use for channel state measurements, and may involve parameters and time RestrictionForChannelMeasurements time RestrictionForInterferenceMeasurements for informing the UE of such measurement restrictions. The configuration of the UE to use eCQI may also include reporting criteria for when the UE shall transmit eCQI information to the gNB. The signalling in Step #1 of FIG. 2 will most likely be using RRC as part of the CSI-ReportConfig IE as defined in standards at the time of this application. Existing RRC signaling is used to configure the maximum number of CBG for the UE, and M could per default use same value of alternatively be configured separately.

In Step #2 of FIG. 2, the UE performs measurements on the indicated reference resources to determine the received post detection SINR. Based on these measurements, the UE estimates the effective SINR for the M CBGs. Here, the UE may apply proprietary outer loop learning, where ex. the correlation among neighbor CBG errors is determined, and thus compensate its assessed effective SINR based on avoiding ex. typical burst errors etc. The UE thereafter (or as part of its proprietary add-on process) determines the highest MCS that it can support, while at most N of the M CBGs are in error with probability P. This may be implemented in the UE by having a table with CBG error rate vs SINR for the different MCS's. Given this, the UE will know the probability of error for each of the M assumed CBGs for each MCS index i, denoted Pe (m,MCS_i). If CBGs errors are assumed uncorrelated, the UE can apply simple probability theory calculations to determine the maximum supported MCS, while at most N of the M CBGs are in error with probability P. However, more advanced compensation is possible for the UE to achieve better performance.

In Step #3 of FIG. 2, the condition for the UE to report the eCQI is met. As for the legacy CQI schemes, the condition for reporting eCQI may be periodical reporting or event-based reporting. The reporting of the eCQI may be in the form of an eCQI index that points to a new eCQI table that enumerates the supported modulation scheme, effective code rate, and overall efficiency that it recommends the gNB to use for its PDSCH transmissions. The eCQI index may be expressed with a 3-5 bit word, although options where more, or fewer, bits are used for the eCQI index reporting are not excluded.

In Step #4 of FIG. 2, the gNB follows the UEs recommendation and transmits a large TB on the PDSCH with M CBGs, using the MCS in line with the latest received eCQI report. Assuming that the channel quality conditions at the UE has not changed too much since the measurements of the eCQI, the UE will decode the PDSCH Tx with at most N of the M CBGs in error with probability P.

In Step #5 of FIG. 2, the UE feeds back the HARQ multi-bit feedback that expresses which CBGs may be in error, and in Step #6 the gNB transmits the corresponding HARQ retransmissions, containing reduced number of CBGs as compared to the first transmission.

FIG. 3 shows a Table 2 with a eCQI reporting scheme with changes in accordance with example embodiments of the invention underlined;

In Table 2 of FIG. 3 there is illustrated how the eCQI potentially could be captured in the PHY layer 3GPP specifications. Hence, Table 2 indicates a rough outline of a possible standards change Request for having the eCQI. Table 2 of FIG. 3 is just an example, as the exact wording for such a CR may slightly differ. Notice that the example in Table 2 include two options for the value of P, namely P=0.1 and P=0.3. Those are reasonable values for the currently considered XR simulation cases, but other values of P are of course not excluded.

The advantage of the proposed eCQI is that it offers spectral efficient PDSCH link adaptation for large TB transmissions while the radio resources for the HARQ retransmissions are efficiently controlled to only account for N out of M CBGs. Analysis shows that if we have M=8 and target at most N=3 CBGs for ReTx with probability P=0.1, then the spectral efficiency is improved by roughly 20% as compared to legacy LA schemes with current CQI (relying on 10% BLER of first transmission). The improved spectral efficiency of using the new PDSCH link adaption method based on the proposed eCQI scheme maps to higher system capacity.

Figure 5A:
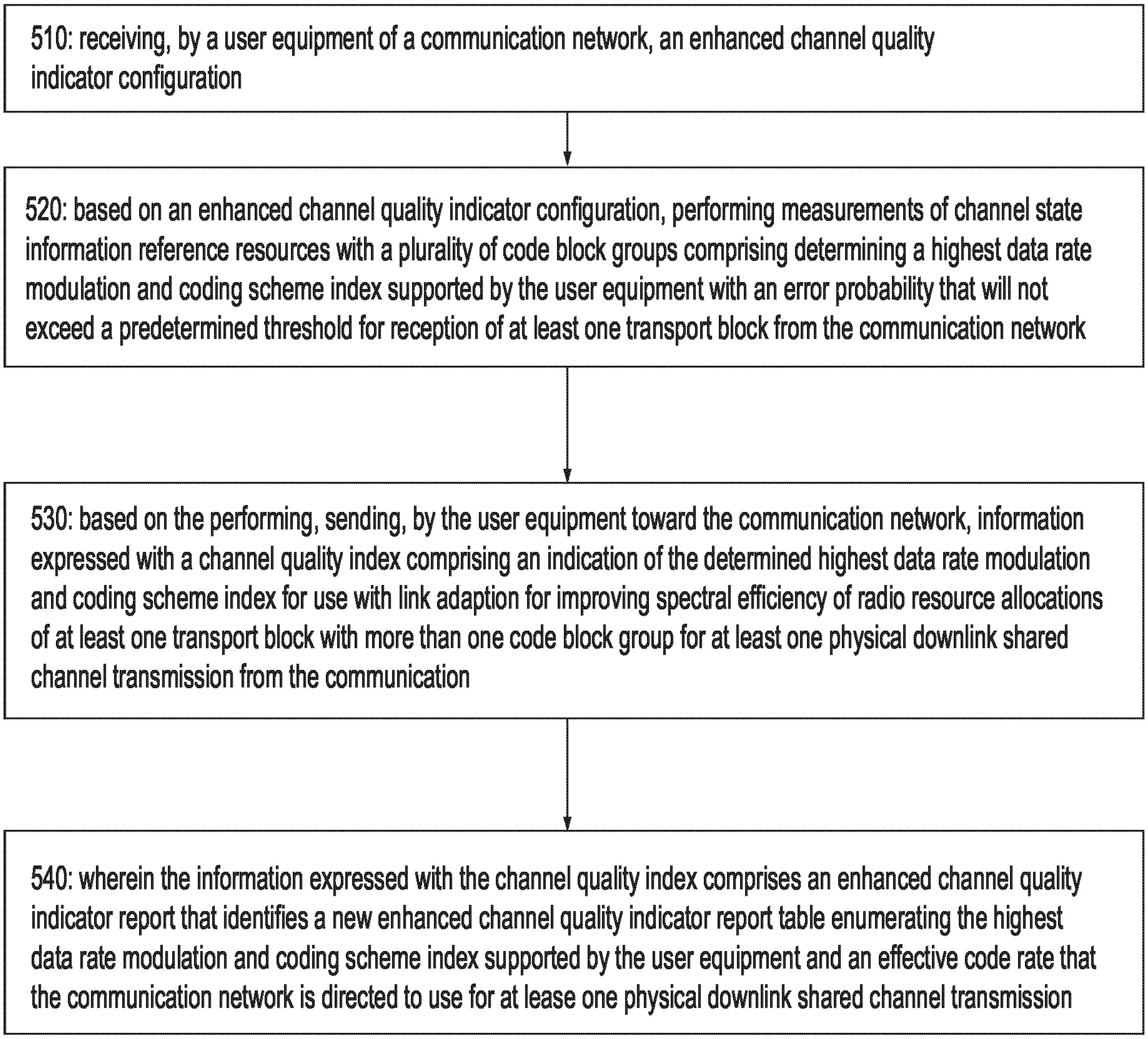
FIG. 5A and FIG. 5B each show a method in accordance with example embodiments of the invention which may be performed by an apparatus.
Figure 5B:
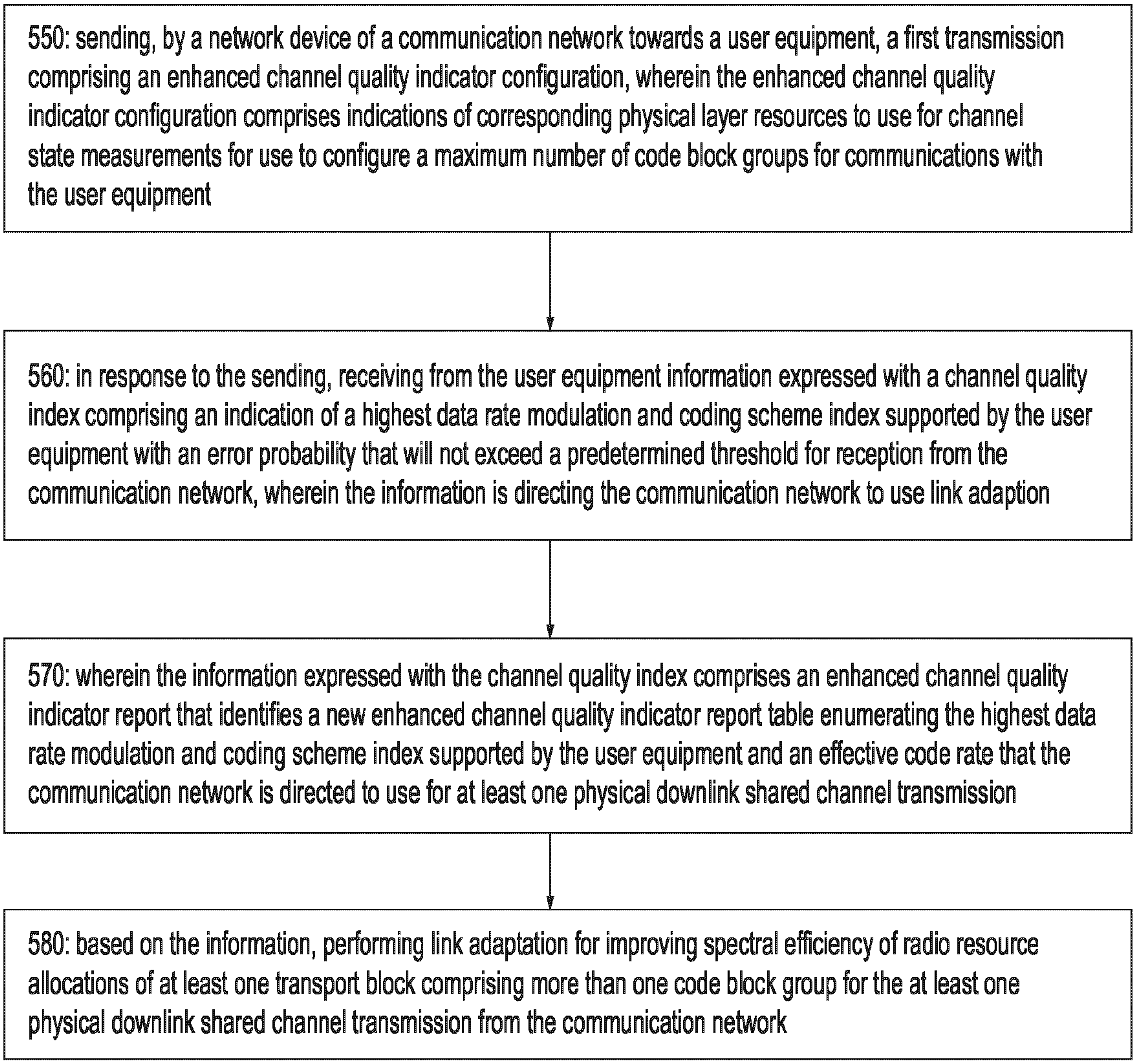

FIG. 5A and FIG. 5B each show a method in accordance with example embodiments of the invention which may be performed by an apparatus.

FIG. 5A illustrates operations which may be performed by a device such as, but not limited to, a device (e.g., the UE 110 as in FIG. 4). As shown in step 510 of FIG. 5A there is receiving, by a user equipment of a communication network, an enhanced channel quality indicator configuration. As shown in step 520 of FIG. 5A there is, based on an enhanced channel quality indicator configuration, performing measurements of channel state information reference resources with a plurality of code block groups comprising determining a highest data rate modulation and coding scheme index supported by the user equipment with an error probability that will not exceed a predetermined threshold for reception of at least one transport block from the communication network. Then as shown in step 530 of FIG. 5A there is, based on the performing, sending, by the user equipment toward the communication network, information expressed with a channel quality index comprising an indication of the determined highest data rate modulation and coding scheme index for use with link adaption for improving spectral efficiency of radio resource allocations of at least one transport block with more than one code block group for at least one physical downlink shared channel transmission from the communication network. As shown in step 540 of FIG. 5A wherein the information expressed with the channel quality index comprises an enhanced channel quality indicator report that identifies a new enhanced channel quality indicator report table enumerating the highest data rate modulation and coding scheme index supported by the user equipment and an effective code rate that the communication network is directed to use for the at least one physical downlink shared channel transmission.

In accordance with the example embodiments as described in the paragraph above, wherein the at least one transport block comprises M code block groups of the plurality of code block groups, wherein the error probability not exceeding the predetermined threshold is based on an error probability of N failed code block groups of the M code block groups not exceeding a parameter P of the predetermined threshold, and wherein parameters M, N, and P are provided by the communication network with the enhanced channel quality indicator configuration, wherein parameters M and N are integers and parameter P comprises a value between 0 and 1 indicating an error probability.

In accordance with the example embodiments as described in the paragraphs above, wherein based on the link adaptation the at least one physical downlink shared channel transmission from the communication network comprises large transport blocks with the M code block groups that may contain at least one full or partial extended reality information frame.

In accordance with the example embodiments as described in the paragraphs above, wherein the enhanced channel quality indicator configuration comprises indications of corresponding physical layer resources to use for channel state measurements.

In accordance with the example embodiments as described in the paragraphs above, wherein the enhanced channel quality indicator configuration comprises indications of measurement restrictions for the user equipment comprising at least one of timeRestrictionForChannelMeasurements or timeRestrictionForInterferenceMeasurements.

In accordance with the example embodiments as described in the paragraphs above, wherein the enhanced channel quality indicator configuration comprises reporting criteria for when the user equipment shall send the information comprising the determined highest data rate modulation and coding scheme index towards the communication network.

In accordance with the example embodiments as described in the paragraphs above, wherein the user equipment uses a table stored at the user equipment uses a table stored at the user equipment for determining a probability of error for each of the plurality of code block groups for different modulation and coding schemes of the modulation and coding scheme index, wherein the table comprises a code block group error rate versus the user equipment measured signal to interference noise ratio for the different modulation and coding schemes.

In accordance with the example embodiments as described in the paragraphs above, wherein the measurements comprise: measuring the channel state information reference resources to determine a received signal to interference noise ratio; and based on the measuring, estimating an effective signal to interference noise ratio for different subsets of code blocks of the plurality of code block groups.

In accordance with the example embodiments as described in the paragraphs above, there is sending, by the user equipment towards the communication network, hybrid automatic repeat request multi-bit feedback that identifies a subset of code blocks of the plurality of code block groups in error, wherein the sending is causing corresponding hybrid automatic repeat request retransmissions of the subset of code blocks from the communication network.

In accordance with the example embodiments as described in the paragraphs above, wherein performing the measurements of channel state information reference resources comprises identifying error probabilities and correlations of previous code block group receptions.

A non-transitory computer-readable medium (MEMORY (IES) 125 as in FIG. 4) storing program code (COMPUTER PROGRAM CODE 123 and/or Feedback Module 140-2 as in FIG. 4), the program code executed by at least one processor (PROCESSORS(S) 120 and/or Feedback Module 140-1 as in FIG. 4) to perform the operations as at least described in the paragraphs above.

In accordance with an example embodiment of the invention as described above there is an apparatus comprising: means for receiving (one or more transceivers 130, MEMORY(IES) 125, COMPUTER PROGRAM CODE 123 and/or Feedback Module 140-2, and PROCESSORS(S) 120 and/or Feedback Module 140-1 as in FIG. 4), by a user equipment (UE 110 as in FIG. 4) of a communication network (Network 100 as in FIG. 4), an enhanced channel quality indicator configuration; means, based on an enhanced channel quality indicator configuration, for performing (one or more transceivers 130, MEMORY(IES) 125, COMPUTER PROGRAM CODE 123 and/or Feedback Module 140-2, and PROCESSORS(S) 120 and/or Feedback Module 140-1 as in FIG. 4) measurements of channel state information reference resources with a plurality of code block groups comprising determining a highest data rate modulation and coding scheme index supported by the user equipment with an error probability that will not exceed a predetermined threshold for reception of at least one transport block from the communication network; then means, based on the performing, for sending (one or more transceivers 130, MEMORY(IES) 125, COMPUTER PROGRAM CODE 123 and/or Feedback Module 140-2, and PROCESSORS(S) 120 and/or Feedback Module 140-1 as in FIG. 4), by the user equipment toward the communication network, information expressed with a channel quality index comprising an indication of the determined highest data rate modulation and coding scheme index for use with link adaption for improving spectral efficiency of radio resource allocations of at least one transport block with more than one code block group for at least one physical downlink shared channel transmission from the communication network; and wherein the information expressed with the channel quality index comprises an enhanced channel quality indicator report that identifies a new enhanced channel quality indicator report table enumerating the highest data rate modulation and coding scheme index supported by the user equipment and an effective code rate that the communication network is directed to use for the at least one physical downlink shared channel transmission.

In the example aspect of the invention according to the paragraph above, wherein at least the means for receiving, performing, and sending comprises a non-transitory computer readable medium [MEMORY(IES) 125 as in FIG. 4] encoded with a computer program [COMPUTER PROGRAM CODE 123 and/or Feedback Module 140-2 as in FIG. 4] executable by at least one processor [PROCESSORS(S) 120 and/or Feedback Module 140-1 as in FIG. 4].

FIG. 5B illustrates operations which may be performed by a network device such as, but not limited to, a network node such as the eNB/gNB 170 as in FIG. 4. As shown in step 550 of FIG. 5B there is sending, by a network device of a communication network towards a user equipment, a first transmission comprising an enhanced channel quality indicator configuration, wherein the enhanced channel quality indicator configuration comprises indications of corresponding physical layer resources to use for channel state measurements for use to configure a maximum number of code block groups for communications with the user equipment. As shown in step 560 of FIG. 5B there is, in response to the sending, receiving from the user equipment information expressed with a channel quality index comprising an indication of a highest data rate modulation and coding scheme index supported by the user equipment with an error probability that will not exceed a predetermined threshold for reception from the communication network, wherein the information is directing the communication network to use link adaption. As shown in step 570 of FIG. 5B, wherein the information expressed with the channel quality index comprises an enhanced channel quality indicator report that identifies a new enhanced channel quality indicator report table enumerating the highest data rate modulation and coding scheme index supported by the user equipment and an effective code rate that the communication network is directed to use for at least one physical downlink shared channel transmission. Then as shown in step 580 of FIG. 5B there is, based on the information, performing link adaptation for improving spectral efficiency of radio resource allocations of at least one transport block comprising more than one code block group for the at least one physical downlink shared channel transmission from the communication network.

In accordance with the example embodiments as described in the paragraph above, there is receiving, by the network device from the user equipment, a code block group hybrid automatic repeat request multi-bit feedback that identifies a subset of code blocks of the plurality of code block groups in error, based on the receiving transmitting a further transmission towards the user equipment corresponding hybrid automatic repeat request retransmissions of the subset of code blocks from the communication network, wherein the hybrid automatic repeat request retransmissions comprise a reduced number of code block groups as compared to the first transmission.

In accordance with the example embodiments as described in the paragraphs above, wherein the enhanced channel quality indicator configuration causes the user equipment to perform measurements of channel state information reference resources with a plurality of code block groups for determining the highest data rate modulation and coding scheme index supported by the user equipment based on identifying at least one transport block that comprises M code block groups of the plurality of code block groups, wherein the error probability not exceeding the predetermined threshold is based on an error probability of N failed code block groups of the M code block groups not exceeding a parameter P of the predetermined threshold, and wherein parameters M, N, and P provided to the user equipment by the communication network with the enhanced channel quality indicator configuration, wherein parameters M and N are integers and parameter P comprises a value between 0 and 1 indicating an error probability.

In accordance with the example embodiments as described in the paragraphs above, wherein based on the link adaptation the at least one physical downlink shared channel transmission from the communication network comprises large transport blocks with the M code block groups that may contain at least one full or partial extended reality information frame.

In accordance with the example embodiments as described in the paragraphs above, wherein the enhanced channel quality indicator configuration comprises indications of corresponding physical layer resources to use for channel state measurements.

In accordance with the example embodiments as described in the paragraphs above, wherein the enhanced channel quality indicator configuration comprises indications of measurement restrictions for the user equipment comprising of timeRestrictionForChannelMeasurements or at least one timeRestrictionForInterferenceMeasurements.

In accordance with the example embodiments as described in the paragraphs above, wherein the enhanced channel quality indicator configuration comprises reporting criteria for when the user equipment shall send the information comprising the determined highest data rate modulation and coding scheme index towards the communication network.

In accordance with the example embodiments as described in the paragraphs above, wherein the link adaptation is conducted according to an enhanced channel quality indicator index when scheduling the at least one physical downlink shared channel transmission.

A non-transitory computer-readable medium (MEMORY (IES) 155 as in FIG. 4) storing program code (COMPUTER PROGRAM CODE 153 and/or Feedback Module 150-2 as in FIG. 4), the program code executed by at least one processor (PROCESSORS(S) 152 and/or Feedback Module 150-1 as in FIG. 4) to perform the operations as at least described in the paragraphs above.

In accordance with an example embodiment of the invention as described above there is an apparatus comprising: means for sending (remote radio head 195, MEMORY(IES) 155, COMPUTER PROGRAM CODE 153 and/or Feedback Module 150-2, and PROCESSORS(S) 152 and/or Feedback Module 150-1 as in FIG. 4), by a network device (eNB/gNB

170 as in FIG. 4) of a communication network (Network 100 as in FIG. 4) towards a user equipment (UE 110 as in FIG. 4), a first transmission comprising an enhanced channel quality indicator configuration, wherein the enhanced channel quality indicator configuration comprises indications (remote radio head 195, MEMORY(IES) 155, COMPUTER PROGRAM CODE 153 and/or Feedback Module 150-2, and PROCESSORS(S) 152 and/or Feedback Module 150-1 as in FIG. 4) of corresponding physical layer resources to use for channel state measurements for use to configure a maximum number of code block groups for communications with the user equipment; means, in response to the sending, for receiving (remote radio head 195, MEMORY(IES) 155, COMPUTER PROGRAM CODE 153 and/or Feedback Module 150-2, and PROCESSORS(S) 152 and/or Feedback Module 150-1 as in FIG. 4) from the user equipment information expressed with a channel quality index comprising an indication of a highest data rate modulation and coding scheme index supported by the user equipment with an error probability that will not exceed a predetermined threshold for reception from the communication network, wherein the information is directing the communication network to use link adaption, wherein the information expressed with the channel quality index comprises an enhanced channel quality indicator report that identifies a new enhanced channel quality indicator report table enumerating the highest data rate modulation and coding scheme index supported by the user equipment and an effective code rate that the communication network is directed to use for at least one physical downlink shared channel transmission; and based on the information, performing (remote radio head 195, MEMORY(IES) 155, COMPUTER PROGRAM CODE 153 and/or Feedback Module 150-2, and PROCESSORS(S) 152 and/or Feedback Module 150-1 as in FIG. 4) link adaptation for improving spectral efficiency of radio resource allocations of at least one transport block comprising more than one code block group for the at least one physical downlink shared channel transmission from the communication network.

In the example aspect of the invention according to the paragraph above, wherein at least the means for sending, receiving, and performing comprises a non-transitory computer readable medium [MEMORY(IES) 155 as in FIG. 4] encoded with a computer program [COMPUTER PROGRAM CODE 153 and/or Feedback Module 150-2 as in FIG. 4] executable by at least one processor [PROCESSORS(S) 152 and/or Feedback Module 150-1 as in FIG. 4].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:

(a) hardware-only circuit implementations (such as implementations in only analog and/or digital circuitry); and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:

at least one processor; and at least one memory, the at least one memory storing instructions, that when executed by the least one processor, to cause the apparatus to at least:

receive an enhanced channel quality indicator configuration;

based on an enhanced channel quality indicator configuration, perform measurements of channel state information reference resources with a plurality of code block groups comprising determining a highest data rate modulation and coding scheme index supported by the apparatus with an error probability that will not exceed a predetermined threshold for reception of at least one transport block from the communication network; and based on the performing, send, towards a communication network, information expressed with a channel quality index comprising an indication of the determined highest data rate modulation and coding scheme index for use with link adaption for improving spectral efficiency of radio resource allocations of at least one transport block with more than one code block group for at least one physical downlink shared channel transmission from the communication network, wherein the information expressed with the channel quality index comprises an enhanced channel quality indicator report that identifies a new enhanced channel quality indicator report table enumerating the highest data rate modulation and coding scheme index supported by the apparatus and an effective code rate that the communication network is directed to use for the at least one physical downlink shared channel transmission.

2. The apparatus according to claim 1, wherein the at least one transport block comprises M code block groups of the plurality of code block groups, wherein the error probability not exceeding the predetermined threshold is based on an error probability of N failed code block groups of the M code block groups not exceeding a parameter P of the predetermined threshold, and wherein parameters M, N, and P are provided by the communication network with the enhanced channel quality indicator configuration, wherein parameters M and N are integers and parameter P comprises a value between 0 and 1 indicating an error probability.

3. The apparatus according to claim 1, wherein the enhanced channel quality indicator configuration comprises indications of corresponding physical layer resources to use for channel state measurements.

4. The apparatus according to claim 1, wherein the enhanced channel quality indicator configuration comprises reporting criteria for when the apparatus shall send the information comprising the determined highest data rate modulation and coding scheme index towards the communication network.

5. The apparatus according to claim 1, wherein the at least one processor;

and the at least one memory, the at least one memory storing instructions, that when executed by the least one processor, further cause the apparatus to at least:

use a table stored for determining a probability of error for each of the plurality of code block groups for different modulation and coding schemes of the modulation and coding scheme index, wherein the table comprises a code block group error rate versus the apparatus measured signal to interference plus noise ratio for the different modulation and coding schemes.

6. The apparatus according to claim 1, wherein the measurements comprise:

measuring the channel state information reference resources to determine a received signal to interference noise ratio; and based on the measuring, estimating an effective signal to interference noise ratio for different subsets of code blocks of the plurality of code block groups.

7. The apparatus according to claim 1, wherein performing the measurements of channel state information reference resources comprises identifying error probabilities and correlations of previous code block group receptions.

8. A method, comprising:

receiving, by a user equipment of a communication network, an enhanced channel quality indicator configuration;

based on an enhanced channel quality indicator configuration, performing measurements of channel state information reference resources with a plurality of code block groups comprising determining a highest data rate modulation and coding scheme index supported by the user equipment with an error probability that will not exceed a predetermined threshold for reception of at least one transport block from the communication network; and based on the performing, sending, by the user equipment toward the communication network, information expressed with a channel quality index comprising an indication of the determined highest data rate modulation and coding scheme index for use with link adaption for improving spectral efficiency of radio resource allocations of at least one transport block with more than one code block group for at least one physical downlink shared channel transmission from the communication network, wherein the information expressed with the channel quality index comprises an enhanced channel quality indicator report that identifies a new enhanced channel quality indicator report table enumerating the highest data rate modulation and coding scheme index supported by the user equipment and an effective code rate that the communication network is directed to use for the at least one physical downlink shared channel transmission.

9. The method according to claim 8, wherein the at least one transport block comprises M code block groups of the plurality of code block groups, wherein the error probability not exceeding the predetermined threshold is based on an error probability of N failed code block groups of the M code block groups not exceeding a parameter P of the predetermined threshold, and wherein parameters M, N, and P are provided by the communication network with the enhanced channel quality indicator configuration, wherein parameters M and N are integers and parameter P comprises a value between 0 and 1 indicating an error probability.

10. The method according to claim 8, wherein the enhanced channel quality indicator configuration comprises indications of corresponding physical layer resources to use for channel state measurements.

11. The method according to claim 8, wherein the enhanced channel quality indicator configuration comprises reporting criteria for when the user equipment shall send the information comprising the determined highest data rate modulation and coding scheme index towards the communication network.

12. The method according to claim 8, wherein the user equipment uses a table stored at the user equipment uses a table stored at the user equipment for determining a probability of error for each of the plurality of code block groups for different modulation and coding schemes of the modulation and coding scheme index, wherein the table comprises a code block group error rate versus user equipment measured signal to interference plus noise ratio for the different modulation and coding schemes.

13. The method according to claim 8, wherein the measurements comprise:

measuring the channel state information reference resources to determine a received signal to interference plus noise ratio; and based on the measuring, estimating an effective signal to interference plus noise ratio for different subsets of code blocks of the plurality of code block groups.

14. An apparatus, comprising:

at least one processor; and at least one memory, the at least one memory storing instructions, that when executed by the least one processor, to cause the apparatus to at least:

send towards a user equipment, a first transmission comprising an enhanced channel quality indicator configuration, wherein the enhanced channel quality indicator configuration comprises indications of corresponding physical layer resources to use for channel state measurements for use to configure a maximum number of code block groups for communications with the user equipment;

in response to the sending, receive from the user equipment information expressed with a channel quality index comprising an indication of a highest data rate modulation and coding scheme index supported by the user equipment with an error probability that will not exceed a predetermined threshold for reception from a communication network, wherein the information is directing the communication network to use link adaption, wherein the information expressed with the channel quality index comprises an enhanced channel quality indicator report that identifies a new enhanced channel quality indicator report table enumerating the highest data rate modulation and coding scheme index supported by the user equipment and an effective code rate that the communication network is directed to use for at least one physical downlink shared channel transmission; and based on the information, perform link adaptation for improving spectral efficiency of radio resource allocations of at least one transport block comprising more than one code block group for the at least one physical downlink shared channel transmission from the communication network.

15. The apparatus according to claim 14, wherein the at least one processor; and the at least one memory, the at least one memory storing instructions, that when executed by the least one processor, further cause the apparatus to at least:

receive, from the user equipment, a code block group hybrid automatic repeat request multi-bit feedback that identifies a subset of code blocks of the plurality of code block groups in error, transmit, based on the reception, a further transmission towards the user equipment corresponding hybrid automatic repeat request retransmissions of the subset of code blocks from the communication network, wherein the hybrid automatic repeat request retransmissions comprises a reduced number of code block groups as compared to the first transmission.

16. The apparatus according to claim 14, wherein the enhanced channel quality indicator configuration causes the user equipment to perform measurements of channel state information reference resources with a plurality of code block groups for determining the highest data rate modulation and coding scheme index supported by the user equipment based on identifying at least one transport block that comprises M code block groups of the plurality of code block groups, wherein the error probability not exceeding the predetermined threshold is based on an error probability of N failed code block groups of the M code block groups not exceeding a parameter P of the predetermined threshold, and wherein parameters M, N, and P provided to the user equipment by the communication network with the enhanced channel quality indicator configuration, wherein parameters M and N are integers and parameter P comprises a value between 0 and 1 indicating an error probability.

17. The apparatus according to claim 14, wherein the enhanced channel quality indicator configuration comprises indications of corresponding physical layer resources to use for channel state measurements.

18. The apparatus according to claim 14, wherein the enhanced channel quality indicator configuration comprises indications of measurement restrictions for the user equipment comprising at least one of timeRestrictionForChannelMeasurements or timeRestrictionForInterferenceMeasurements.

19. The apparatus according to claim 14, wherein the enhanced channel quality indicator configuration comprises reporting criteria for when the user equipment shall send the information comprising the determined highest data rate modulation and coding scheme index towards the communication network.

20. The apparatus according to claim 14, wherein the link adaptation is conducted according to an enhanced channel quality indicator index when scheduling the at least one physical downlink shared channel transmission.

* * * * *